Nov. 30, 1937.    R. W. WAGNER    2,100,677
POWER TAKE-OFF ATTACHMENT FOR MOTOR VEHICLES
Filed Oct. 28, 1935    2 Sheets-Sheet 1
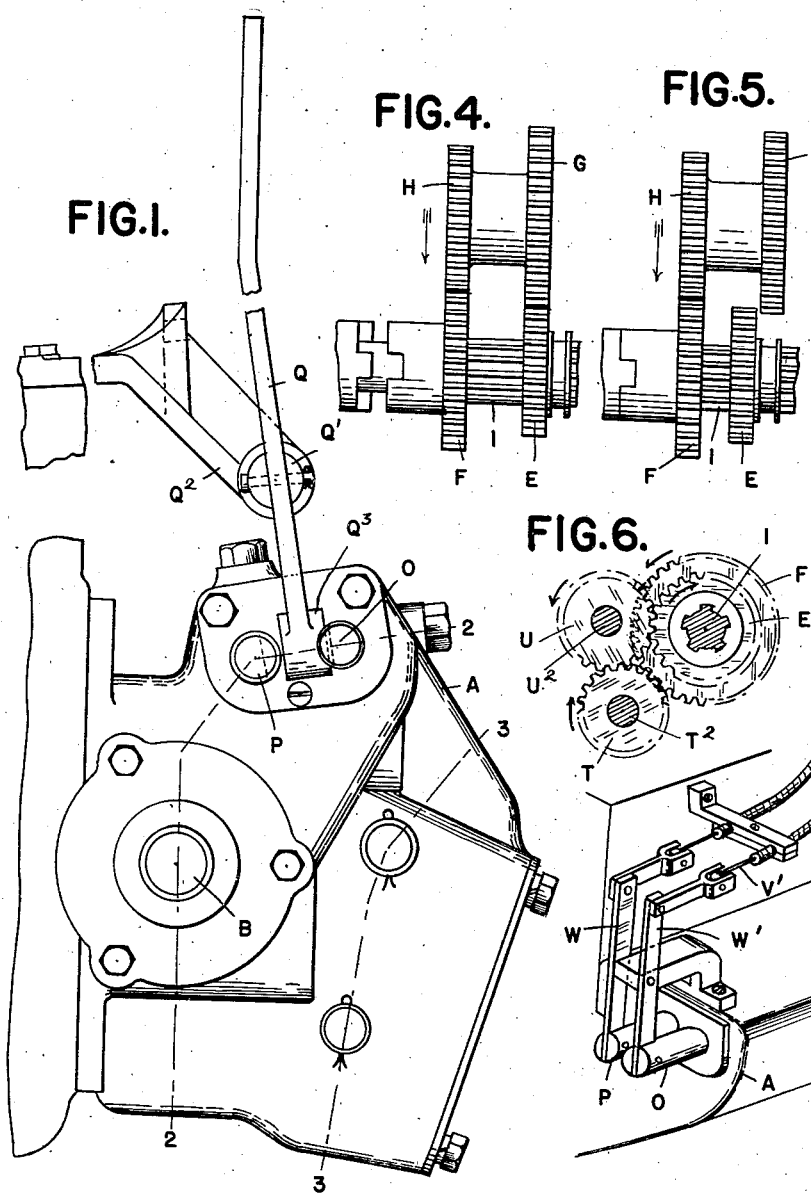
*INVENTOR*
ROBERT W. WAGNER
*ATTORNEYS*

Nov. 30, 1937.    R. W. WAGNER    2,100,677
POWER TAKE-OFF ATTACHMENT FOR MOTOR VEHICLES
Filed Oct. 28, 1935    2 Sheets-Sheet 2

INVENTOR
ROBERT W. WAGNER
BY
ATTORNEYS

Patented Nov. 30, 1937

2,100,677

UNITED STATES PATENT OFFICE 2,100,677

POWER TAKE-OFF ATTACHMENT FOR MOTOR VEHICLES

Robert W. Wagner, Detroit, Mich., assignor to Detroit Harvester Company, Detroit, Mich., a corporation of Michigan Application October 28, 1935, Serial No. 47,165

15 Claims. (Cl. 74—11)

The invention relates to power take-off mechanisms applicable to motor vehicle transmissions and the invention consists in the novel construction as hereinafter set forth.

In the drawings:

Figure 1 is a side elevation of the power take-off unit;

Figures 4, 5 and 6 are diagrams illustrating adjustment for different speeds and direction of drive;

Figure 7 is a diagrammatic elevation showing a modified form of control mechanism.

Figure 3:
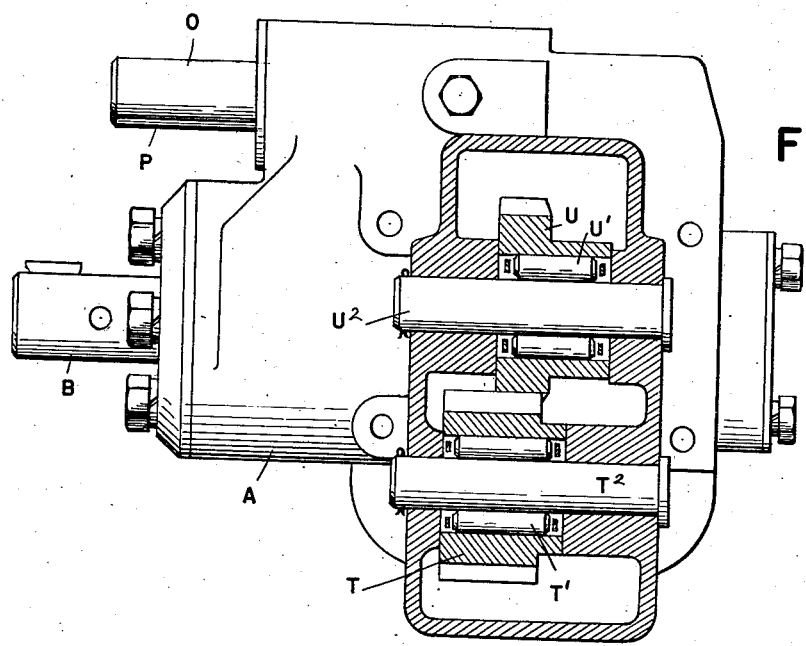
Figure 3 is a section on line 3—3 of Figure 1.

In the present state of the art, various power take-off units have been designed for mounting on the transmission housing of a motor vehicle and cooperating with certain gears within said housing to transmit power to a take-off shaft. It is the object of the present invention to obtain an improved construction through which the take-off shaft may be alternatively driven at two speeds in one direction and one speed in a reverse direction. It is a further object to provide a simple control mechanism for selecting the desired speed and one which will preclude any interference between the trains used for the different speeds. In the construction of motor truck transmissions, it is usual to provide an opening in the housing normally closed by a cover plate, but which when said cover plate is removed will provide access to certain gears within said housing. These gears are constantly driven being arranged upon the countershaft spaced from each other and of different pitch diameters. My power take-off is adapted for attachment to the transmission housing being provided with a housing A having an open face for registering with the opening in the transmission housing when the cover plate of the latter is removed. The two housings are then secured to each other by bolts. Within the housing A and extending transversely there-across is the power take-off shaft B which at one end is journaled in an anti-friction bearing C and at its opposite end in an anti-friction bearing D. Sleeved upon this shaft are the gear wheels E and F adapted to mesh respectively with the gear wheels G and H which are constantly driven gears within the transmission. The gear wheel E is splined upon the shaft B as indicated at I and is adapted to be moved thereon into three different positions. The gear wheel F has an anti-friction roller bearing J on the shaft and is held in constant mesh with the gear wheel H, by means of a collar K on the shaft bearing against one side thereof and a bearing L on the housing. The hub M of the gear wheel F has formed at the outer end thereof clutch teeth M′ adapted to be engaged by a clutch collar N splined upon the shaft B. O and P are shifter shafts slidable in bearings in the upper portion of the housing A and extending parallel to the shaft B. The shaft O has a shifter fork O′ engaging a groove in the clutch collar N and the shaft P has a shifter fork P′ engaging a groove in the collar on the gear E. Both shafts extend outward through one side of the housing A and are actuated alternatively by a suitable control mechanism. As shown in Figure 1, this comprises a lever Q which is universally pivoted at Q′ upon a bracket member Q² which is attached to the transmission gear housing. One end of this lever is provided with the oppositely extending central lugs Q³ adapted to alternatively engage slots in the adjacent sides of the shafts O and P, so that the rocking of said lever will actuate the engaged shaft. There is also provided an interlocking mechanism which insures the holding of one of these shifter shafts stationary whenever the other shaft is actuated. This comprises a pin R arranged in the bearing between the shafts O and P and registering with grooves O² and P² in said shafts. The dimension of the pin R is such that whenever one of the shafts is moved with its groove out of registration with the pin this will force said pin into locking engagement with the groove of the other shaft. There is also a latch S yieldably actuated by a spring S′ and alternatively engaging the groove O² and a notch O³ in the shaft O in the different positions of adjustment of the clutch collar N.

Arranged within the housing A in constant mesh with the gear wheel F is a pinion T which has an anti-friction roller bearing T′ upon a supporting shaft T². U is another pinion which is in constant mesh with the pinion T, but is out of mesh with the gear wheel F. This pinion U has an anti-friction roller bearing U′ on a supporting shaft U² and is so positioned that the gear wheel E in one position of the adjustment thereof will intermesh therewith.

Figure 2:
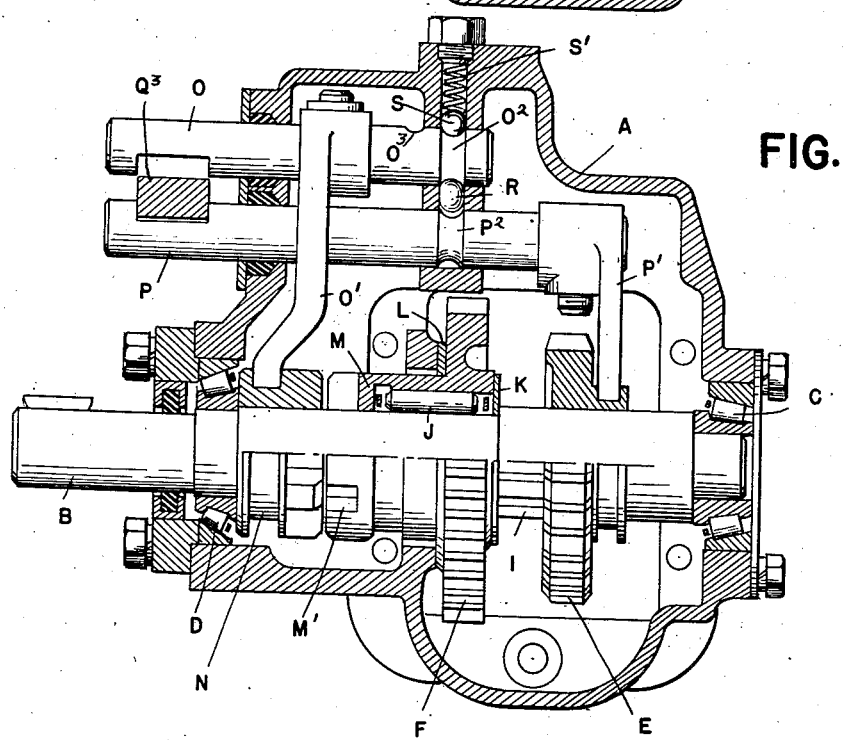
Figure 2 is a section on line 2—2 of Figure 1.

With the construction as described, the gear wheel E is normally in the position shown in Figure 2 of the drawings, where it is out of mesh with the gear wheel G of the transmission mechanism. The gear wheel F, however, remains in constant mesh with the gear wheel H of said transmission and as a consequence the gear F and pinions T and U will be constantly driven. However, as these gear wheels are mounted upon anti-friction roller bearings they will offer very little resistance to such movement. The clutch collar N is also normally in the position shown in Figure 2, where it is out of engagement with the clutch teeth M' on the hub M. Thus, in this position of parts, no movement will be communicated from the transmission to the power take-off shaft B. When it is desired to drive in a forward direction at high speed, the shifter shaft P is actuated through the medium of the lever Q and in a direction to move the gear wheel E to the right (Figure 2). This will bring said gear wheel into mesh with the gear wheel G of the transmission and will therefore communicate the movement of the latter gear to the shaft B. If, on the other hand, it is desired to drive the shaft B in the reverse direction, the shifter shaft P is actuated in the reverse direction so as to move the gear wheel E past its neutral point into a position where it will intermesh with the pinion U. Movement will then be communicated from the transmission gear H successively through the gear wheel F, pinions T, U and gear wheel E driving the latter in the reverse direction and communicating this movement to the shaft B. If it is desired to drive forward at a lower speed, the shifter P is moved to neutral position and the shifter O is actuated to the right (Figure 2). This will move the clutch collar N into engagement with the clutch teeth M' thereby coupling the gear wheel F to the shaft B and effecting a driving of the same from the gear wheel H of the transmission through the gear wheel F to the shaft.

In place of controlling the shifting of the gears by the lever Q, I may provide a control mechanism, such as illustrated in Figure 7. This comprises flexible tubular casings V which are anchored at one end to the casing A and extend therefrom to the desired point of control, such for instance as the dash or instrument board of the motor vehicle to which they are fixedly secured. V' are flexible members extending through these tubes and provided at the point of control with a push-and-pull connection V². The opposite ends of the flexible members V' are connected to levers W and W' which in turn are operatively connected to the shafts O and P. The arrangement is such that either of the shafts O or P may be actuated by pulling or pushing a corresponding member on the dash, and by reason of the fact that both the transmission member and the surrounding casing are flexible, they may be conveniently arranged so as not to interfere with other parts.

What I claim as my invention is:

1. A self-contained power take-off unit having a housing for attachment to a motor vehicle transmission casing, a power take-off shaft journaled in the housing, a pair of gears mounted on said shaft within said housing and respectively splined to said shaft and freely revoluble thereon, said freely revoluble gear being adapted to constantly mesh with a cooperating constantly driven gear in the transmission mechanism, and said splined gear being shiftable into and out of mesh with a constantly driven gear in said transmission mechanism, and a reversing train within said housing in constant mesh with said freely revoluble gear and engageable with said splined gear in one position of adjustment thereof.

2. A self-contained power take-off unit having a housing for attachment to a motor vehicle transmission casing, a power take-off shaft journaled in the housing, a pair of gears mounted on said shaft within said housing and respectively splined to said shaft and freely revoluble thereon, said freely revoluble gear being adapted to constantly mesh with a cooperating constantly driven gear in the transmission mechanism, and said splined gear being shiftable into and out of mesh with a constantly driven gear in said transmission mechanism, a clutch within said housing for coupling said freely revoluble gear with said shaft, a reversing train within said housing in constant mesh with said freely revoluble gear and including said splined gear in one position of adjustment thereof, means carried by said housing for alternatively actuating said clutch and shifting said splined gear, and means also carried by said housing for preventing the simultaneous actuation thereof.

3. A self-contained power take-off unit having a housing for attachment to a motor vehicle transmission casing, a power take-off shaft journaled in said housing, a pair of gears mounted on said shaft within said housing and respectively splined to said shaft and freely revoluble thereon, said freely revoluble gear being adapted to constantly mesh with a cooperating constantly driven gear in the transmission mechanism, and said splined gear being shiftable into and out of mesh with a constantly driven gear in said transmission mechanism, a clutch within said housing for coupling said freely revoluble gear with said shaft, a reversing train within said housing including a pinion in constant mesh with said freely revoluble gear and having a portion projecting beyond the same, a second pinion in mesh with the projecting portion of said first pinion adapted to mesh with said splined gear in one position of adjustment thereof, and means carried by said housing for alternatively operating said clutch and shifting said splined gear.

4. A self-contained power take-off unit having a housing for attachment to a motor vehicle transmission casing, a power take-off shaft journaled in said housing, a pair of gears mounted on said shaft within said housing and respectively splined to said shaft and freely revoluble thereon, said freely revoluble gear being adapted to constantly mesh with a cooperating constantly driven gear in the transmission mechanism, and said splined gear being shiftable into and out of mesh with a constantly driven gear in said transmission mechanism, a pair of shafts within said housing parallel to said driven shaft, pinions respectively mounted on the shafts of said pair, one in constant mesh with said freely revoluble gear, and the other in constant mesh with the first pinion and having a portion projecting beyond the same adapted to intermesh with said splined gear in one position of adjustment thereof, anti-friction roller bearings for all of said constantly running gears, a clutch within said housing for coupling said freely revoluble gear with said shaft, shifter shafts slidably mounted in said housing parallel to said driven shaft, shifter forks on said shifter shafts respectively engaging said clutch and said splined gear, means carried by said housing for alternatively actuating said shifter shafts, and interlocking means for preventing the simultaneous actuation thereof.

5. A self-contained power take-off device having a housing attachable to a transmission casing, a power take-off shaft journaled in said housing, two gears sleeved upon said shaft within said housing, one of said gears being splined upon said shaft and adapted to slide thereon into three different positions, the second gear adapted to constantly mesh with a constantly driven transmission gear, the second gear having a hub provided with clutch teeth, a clutch collar splined on said power take-off shaft within said housing and engageable with said clutch teeth, a pinion in constant mesh with the second gear, and a second pinion in constant mesh with the first pinion but out of mesh with the second gear, two shifter shafts slidably mounted in said housing in substantially parallel relation to said power take-off shaft, one of said shifter shafts having a shifter fork for actuating the collar, the second shifter shaft having a shifter fork for actuating the first mentioned gear, a lever for alternately actuating said shifter shafts, means for holding one of said shifter shafts against movement while the other shaft is actuated, and means for holding the first mentioned shifter shaft in adjusted position, the arrangement being such that the second shifter shaft is operable by the lever when the first shifter shaft is in a neutral position to move the first gear from neutral into mesh with a constantly driven transmission gear to cause the power take-off shaft to be driven forward at relatively high speed, and is operable by the lever to move the first gear into mesh with the second pinion to cause the power take-off shaft to be reversed, and the first shifter shaft is operable by the lever when the second shifter shaft is in neutral to move the clutch collar into engagement with the clutch teeth on the hub of the second gear to cause the power take-off shaft to be driven forward at a relatively low speed.

6. A self-contained power take-off device having a housing attachable to a transmission casing, a power take-off shaft journaled in said housing, two gears sleeved upon said shaft within said housing, one of said gears being splined upon said shaft and adapted to slide thereon into three different positions, the second gear adapted to constantly mesh with a constantly driven transmission gear, the second gear having a hub provided with clutch teeth, a clutch collar splined on said power take-off shaft and engageable with said clutch teeth, a pinion in constant mesh with the second gear, and a second pinion in constant mesh with the first pinion but out of mesh with the second gear, the arrangement being such that the first gear is movable from neutral into mesh with a constantly driven transmission gear to cause the power take-off shafts to be driven forward at relatively high speed and is movable into mesh with the second pinion to cause the power take-off shaft to be reversed, the clutch collar being movable into engagement with the clutch teeth on the hub of the second gear to cause the power take-off shaft to be driven forward at a relatively low speed.

7. A self-contained power take-off device having a housing attachable to a transmission casing, a power take-off shaft journaled in said housing, two gears sleeved upon said shaft within said housing, one of said gears being splined upon said shaft and adapted to slide thereon into three different positions, the second gear adapted to constantly mesh with a constantly driven transmission gear, the second gear having a hub provided with clutch teeth, a clutch collar splined on said power take-off shaft and engageable with said clutch teeth, a pinion in constant mesh with the second gear, and a second pinion in constant mesh with the first pinion but out of mesh with the second gear, two shifter shafts slidably mounted in said housing in substantially parallel relation to said power take-off shaft, one of said shifter shafts having a shifter fork for actuating the collar, the second shifter shaft having a shifter fork for actuating the first mentioned gear, a lever for alternately actuating said shifter shafts, and means for holding the first mentioned shifter shaft in adjusted position, the arrangement being such that the second shifter shaft is operable by the lever when the first shifter shaft is in a neutral position to move the first gear from neutral into mesh with a constantly driven transmission gear to cause the power take-off shaft to be driven forward at relatively high speed, and is operable by the lever to move the first gear into mesh with the second pinion to cause the power take-off shaft to be reversed, and the first shifter shaft is operable by the lever when the second shifter shaft is in neutral to move the clutch collar into engagement with the clutch teeth on the hub of the second gear to cause the power take-off shaft to be driven forward at a relatively low speed.

8. A self-contained power take-off device having a housing attachable to a transmission casing, a power take-off shaft journaled in said housing, two gears sleeved upon said shaft within said housing, one of said gears being splined upon said shaft and adapted to slide thereon into three different positions, the second gear adapted to constantly mesh with a constantly driven transmission gear, the second gear having a hub provided with clutch teeth, a clutch collar splined on said power take-off shaft and engageable with said clutch teeth, a pinion in constant mesh with the second gear, and a second pinion in constant mesh with the first pinion but out of mesh with the second gear, two shifter shafts slidably mounted in said housing in substantially parallel relation to said power take-off shaft, one of said shifter shafts having a shifter fork for actuating the collar, the second shifter shaft having a shifter fork for actuating the first mentioned gear, a lever for alternately actuating said shifter shafts, and means for holding one of said shifter shafts against movement while the other shaft is actuated, the arrangement being such that the second shifter shaft is operable by the lever when the first shifter shaft is in a neutral position to move the first gear from neutral into mesh with a constantly driven transmission gear to cause the power take-off shaft to be driven forward at relatively high speed, and is operable by the lever to move the first gear into mesh with the second pinion to cause the power take-off shaft to be reversed, and the first shifter shaft is operable by the lever when the second shifter shaft is in neutral to move the clutch collar into engagement with the clutch teeth on the hub of the second gear to cause the power take-off shaft to be driven forward at a relatively low speed.

9. A self-contained power take-off device having a housing attachable to a transmission casing, a power take-off shaft journaled in said housing, two gears sleeved upon said shaft within said housing, one of said gears being splined upon said shaft and adapted to slide thereon into three different positions, the second gear adapted to constantly mesh with a constantly driven transmission gear, the second gear having a hub provided with clutch teeth, a clutch collar splined on said power take-off shaft and engageable with said clutch teeth, a pinion in constant mesh with the second gear, and a second pinion in constant mesh with the first pinion but out of mesh with the second gear, two shifter shafts slidably

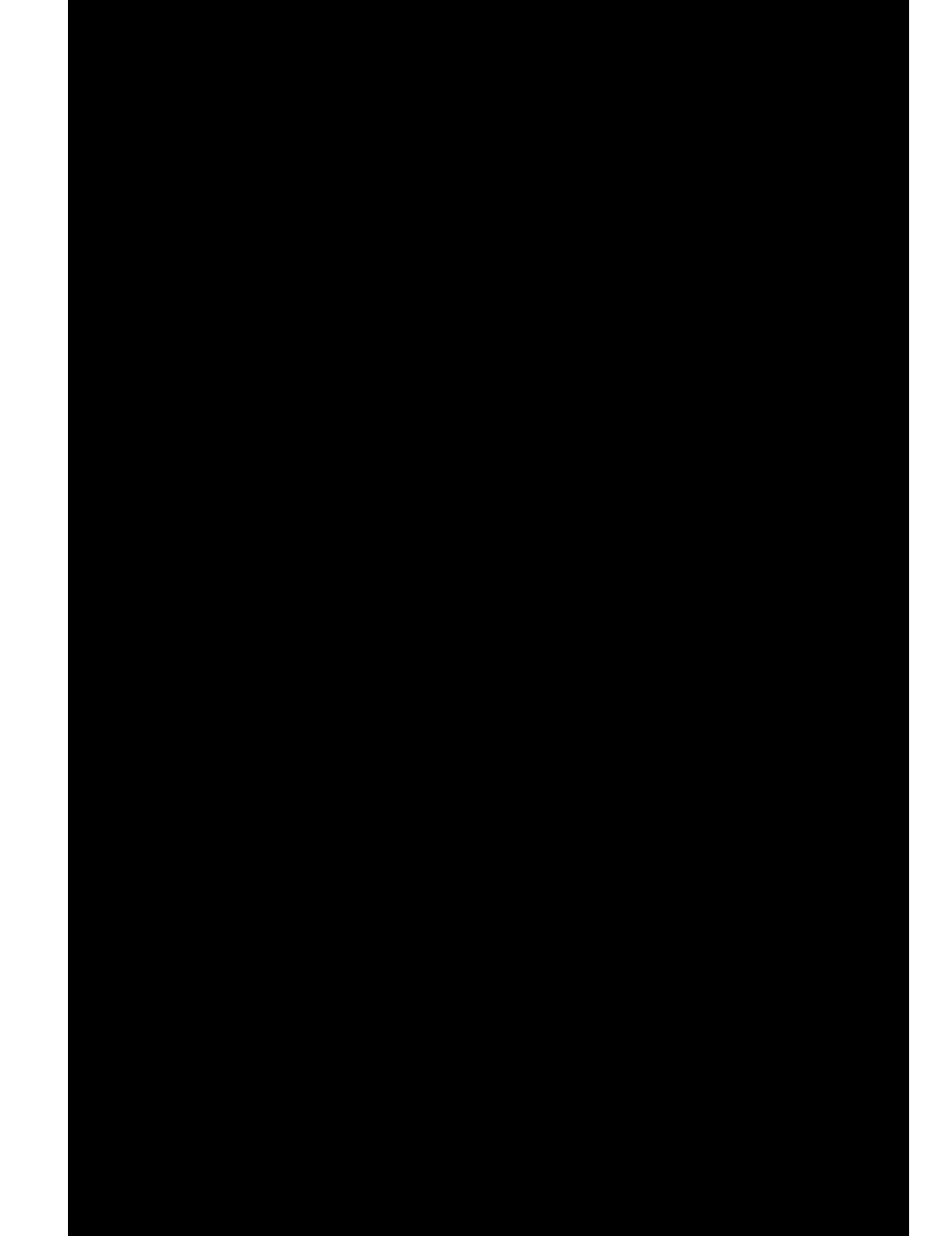

for actuating the same, a pinion within the power take-off housing in constant mesh with the second gear, and a second pinion in constant mesh with the first pinion and adapted to be engaged by the first mentioned gear.

14. A self-contained power take-off unit having a housing attachable to a transmission casing, a power take-off shaft journaled within the power take-off housing, a gear splined upon the power take-off shaft and engageable with a gear in the transmission casing, a second gear sleeved upon the power take-off shaft and adapted to constantly mesh with another gear in the transmission casing, said second gear being provided at one side thereof with clutch teeth, a collar splined on the power take-off shaft and having clutch teeth engageable with the clutch teeth on the second gear, means for shifting the collar aforesaid, means for shifting the first mentioned gear, a pinion within the power take-off housing in constant mesh with the second gear, and a second pinion in constant mesh with the first pinion and adapted to be engaged by the first mentioned gear.

15. A self-contained power take-off device having a housing attachable to a transmission casing, a power take-off shaft journaled in said housing, two gears sleeved upon said shaft within said housing, one of said gears being splined upon said shaft, the second gear adapted to constantly mesh with a constantly driven transmission gear, said second gear having a hub provided with clutch teeth, a clutch collar splined on said power take-off shaft within said housing and engageable with said clutch teeth, a pinion in constant mesh with the second gear, a second pinion in constant mesh with the first pinion but out of mesh with the second gear, two shifter shafts slidably mounted in said housing in substantially parallel relation to said power take-off shaft, one of said shifter shafts having means for actuating the collar, the other shifter shaft having means for actuating the first mentioned gear, and a lever for alternately actuating said shifter shafts.

ROBERT W. WAGNER.